(12) United States Patent
Rao et al.

(10) Patent No.: US 11,618,572 B2
(45) Date of Patent: Apr. 4, 2023

(54) ADJUSTABLE ARMREST ASSEMBLY

(71) Applicant: B/E AEROSPACE, INC., Winston Salem, NC (US)

(72) Inventors: Sreekanth Koti Ananda Rao, Bangalore (IN); Pavan Kumar Krishna Kumar, Bangalore (IN); Pradeep Acharya, Bangalore (IN)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 16/985,639

(22) Filed: Aug. 5, 2020

(65) Prior Publication Data

US 2021/0339871 A1    Nov. 4, 2021

(30) Foreign Application Priority Data

May 1, 2020   (IN) .............................. 202041018717

(51) Int. Cl.
*B64D 11/06*           (2006.01)
(52) U.S. Cl.
CPC ................. *B64D 11/0644* (2014.12)
(58) Field of Classification Search
CPC ............................................... B64D 11/0644
USPC ................................................... 297/411.38
See application file for complete search history.

(56) References Cited

U.S. PATENT DOCUMENTS

| 4,307,913 | A | | 12/1981 | Spiegelhoff | |
|---|---|---|---|---|---|
| 4,619,478 | A | * | 10/1986 | Heimnick | ................ B60N 2/78 297/411.38 X |
| 5,242,138 | A | | 9/1993 | Kornberg | |
| 5,823,976 | A | * | 10/1998 | Cain | ..................... A63B 23/12 601/23 |
| 2019/0365108 | A1 | | 12/2019 | Deevers et al. | |

FOREIGN PATENT DOCUMENTS

| DE | 10104077 | 8/2002 |
|---|---|---|
| EP | 1125788 | 8/2001 |
| EP | 1676743 | 7/2006 |
| EP | 2003016 | 12/2008 |

OTHER PUBLICATIONS

European Patent Office, European Partial Search Report dated Feb. 7, 2022 in Application No. 21171671.7.

* cited by examiner

*Primary Examiner* — Anthony D Barfield
(74) *Attorney, Agent, or Firm* — Snell & Wilmer L.L.P.

(57) ABSTRACT

An adjustable armrest assembly provides for quick and easy height and tilt adjustments to the armrest. Generally, the armrest assembly disclosed herein includes a base, an armrest, and one or more shafts extending from the base and being pivotably coupled to the armrest. By moving the one or more shafts relative to the base, the height and/or tilt of the armrest relative to the base can be adjusted.

8 Claims, 5 Drawing Sheets

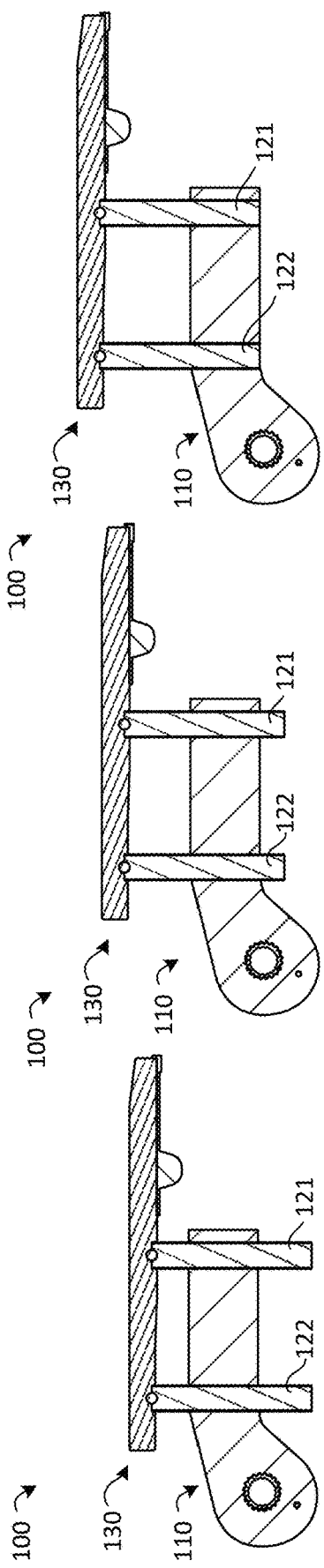 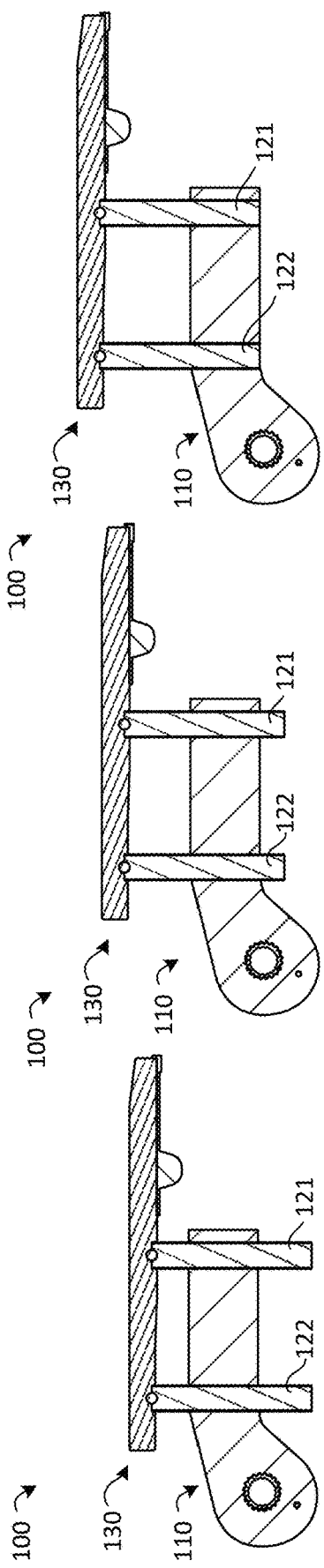 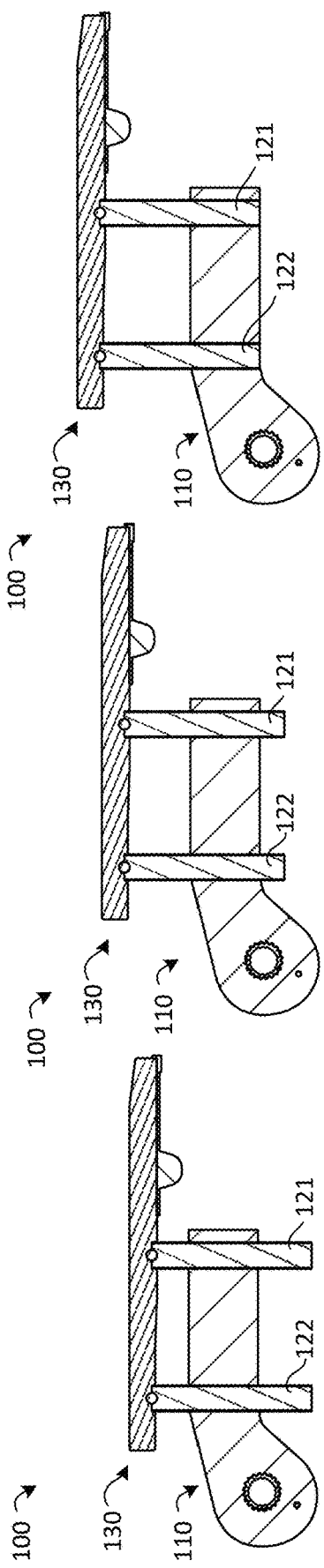
FIG. 2A  FIG. 2B  FIG. 2C
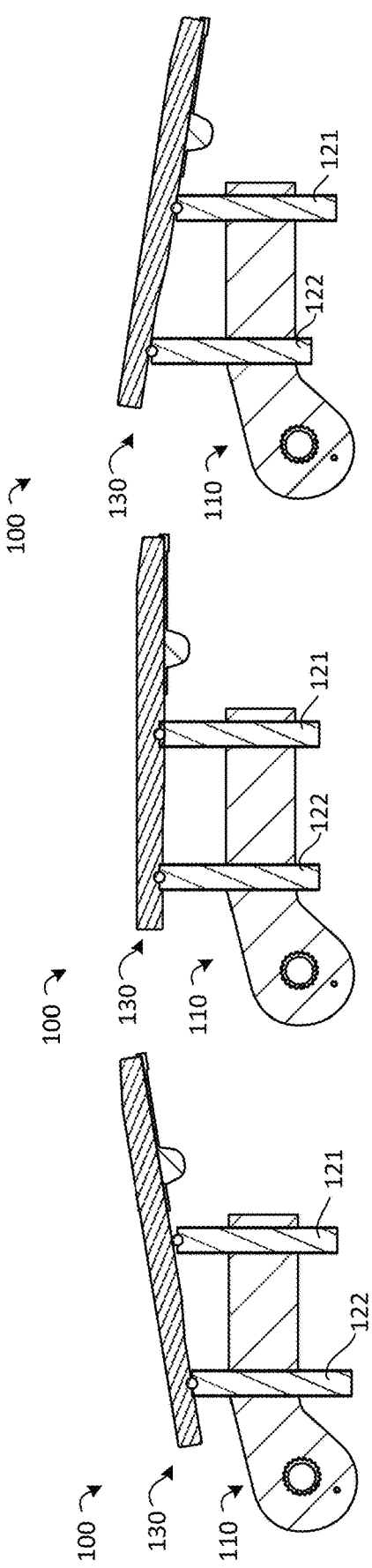 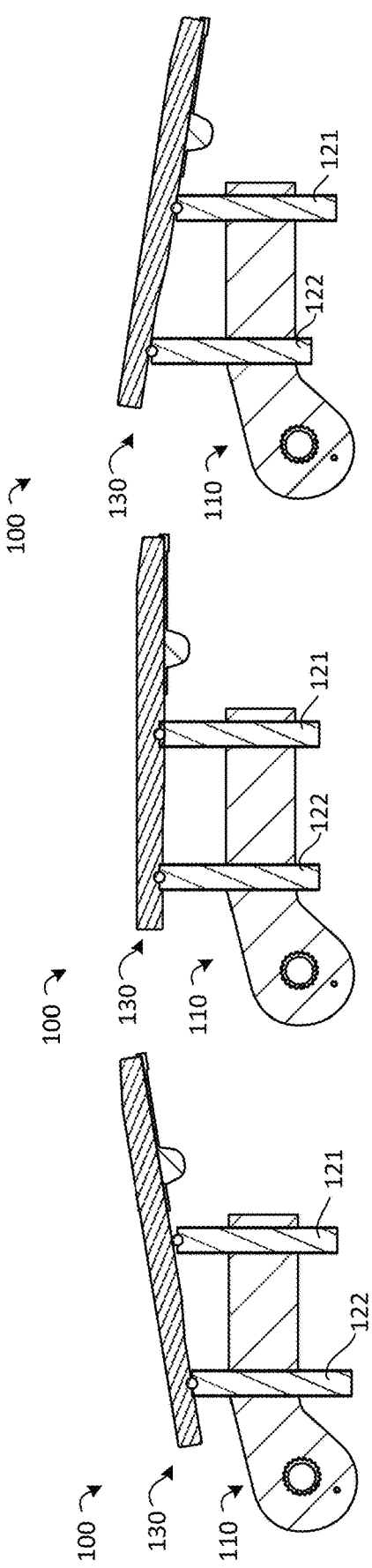 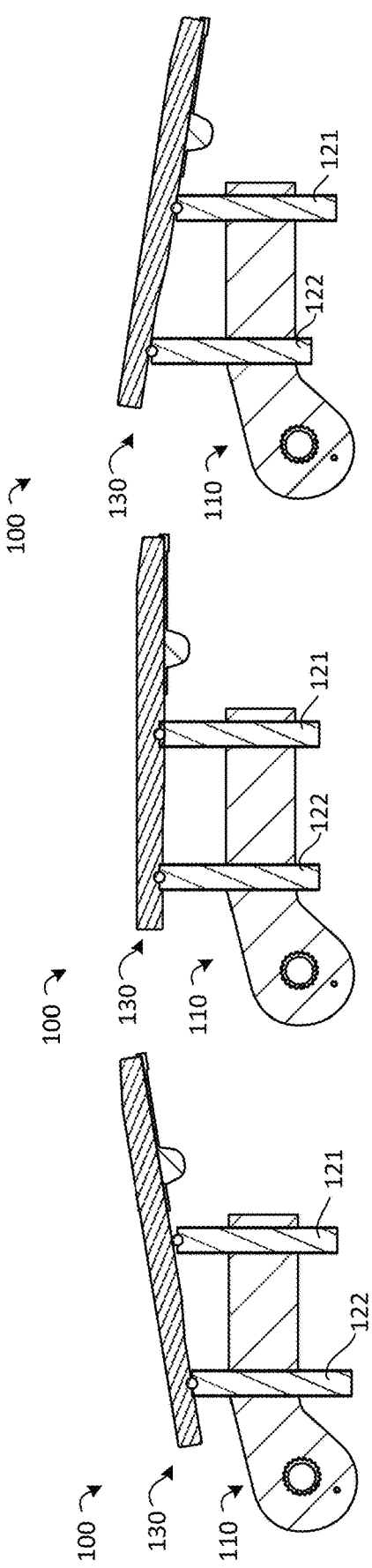
FIG. 3A  FIG. 3B  FIG. 3C

ADJUSTABLE ARMREST ASSEMBLY

CROSS-REFERENCE TO RELATED APPLICATIONS

This application claims priority to and the benefit of Indian Patent Application No. 202041018717 filed May 1, 2020 entitled "ADJUSTABLE ARMREST ASSEMBLY," which is incorporated herein by reference in its entirety for all purposes.

FIELD

The present disclosure relates to armrests, and in particular to adjustable armrest assemblies.

BACKGROUND

Conventional armrests for pilot seats in an aircraft are generally complex, costly, and heavy. For example, conventional armrests are generally configured to provide height and tilt adjustability through a complex series of interconnected parts and moving components. The complexity of conventional armrests increases costs, and the excessive weight adversely affects operational efficiency of the aircraft.

SUMMARY

In various embodiments, the present disclosure provides an armrest assembly for a seat, with the armrest assembly include a base, an armrest, and a shaft. The armrest may have an underside and an upper surface configured to support a user's arm. The shaft may be slidably coupled to the base and pivotably coupled to the underside of the armrest. In various embodiments, the shaft is a first shaft and the armrest assembly further comprises a second shaft pivotably coupled to the underside of the armrest. The shaft may be pivotably coupled to a forward portion of the armrest and the second shaft may be pivotably coupled to a rear portion of the armrest. In various embodiments, the second shaft is also slidably coupled to the base.

In various embodiments, the armrest assembly further includes a locking mechanism configured to reversibly lock the first shaft and the second shaft relative to the base to prevent sliding of the first shaft and the second shaft relative to the base (a "locked configuration"). In various embodiments, the locking mechanism is configured to reversibly release the first shaft and the second shaft relative to the base to allow sliding of the first shaft and the second shaft relative to the base (a "released configuration"). The armrest may include a graspable handle configured to actuate the locking mechanism between the locked configuration and the released configuration.

In various embodiments, the locking mechanism comprises a first clamp ring disposed around the first shaft and a second clamp ring disposed around the second shaft. The graspable handle may be configured to actuate both the first clamp ring and the second clamp ring. The assembly may further include a control cable extending from the graspable handle to the first clamp ring and the second clamp ring.

In various embodiments, the first shaft and the second shaft are threaded. In various embodiments, the first clamp ring and the second clamp ring are threaded. In various embodiments, the base defines a first slot and a second slot, wherein the first shaft is configured to slide longitudinally within the first slot and the second shaft is configured to slide longitudinally within the second slot. The first slot and the second slot may be non-threaded. In various embodiments, each of first clamp ring and the second clamp ring comprises two portions coupled together via a spring element.

Also disclosed herein, according to various embodiments, is an armrest assembly for a seat. The armrest may include a base that defines a first slot and a second slot. The armrest assembly may also include an armrest, a first shaft, and a second shaft. The first shaft may be slidably received within the first slot and pivotably coupled to the underside of the armrest. In various embodiments, the second shaft is non-slidably extending from the base and pivotably coupled to the underside of the armrest. For example, the first shaft may be slidable relative to the base and the second shaft may be non-slidably affixed to or integrally formed with the base. In various embodiments, the armrest assembly further includes a locking mechanism configured to reversibly lock the first shaft relative to the base to prevent sliding of the first shaft relative to the base (a "locked configuration") and to reversibly release the first shaft relative to the base to allow sliding of the first shaft relative to the base (a "released configuration").

Also disclosed herein, according to various embodiments, is an armrest assembly that includes a base defining a first slot and a second slot. The armrest assembly also may include an armrest comprising an underside and an upper surface configured to support a user's arm. Still further, the armrest assembly includes a first shaft slidably received within the first slot and pivotably coupled to the underside of the armrest and a second shaft slidably received within the second slot and pivotably coupled to the underside of the armrest, according to various embodiments.

The armrest assembly may further include a first locking mechanism configured to reversibly lock the first shaft relative to the base to prevent sliding of the first shaft relative to the base and configured to reversibly release the first shaft relative to the base to allow sliding of the first shaft relative to the base. The armrest assembly may also include a second locking mechanism configured to reversibly lock the second shaft relative to the base to prevent sliding of the second shaft relative to the base and configured to reversibly release the second shaft relative to the base to allow sliding of the second shaft relative to the base. The first locking mechanism and the second locking mechanism may be independently and separately actuatable.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 2A is a cross-sectional view of an armrest assembly in a lowered position, in accordance with various embodiments;

FIG. 2B is a cross-sectional view of an armrest assembly in an intermediate position, in accordance with various embodiments;

FIG. 2C is a cross-sectional view of an armrest assembly in a raised position, in accordance with various embodiments;

FIG. 3A is a cross-sectional view of an armrest assembly in a tilted rearward position, in accordance with various embodiments;

FIG. 3B is a cross-sectional view of an armrest assembly in flat position, in accordance with various embodiments;

FIG. 3C is a cross-sectional view of an armrest assembly in a tilted forward position, in accordance with various embodiments;

Figure 1:
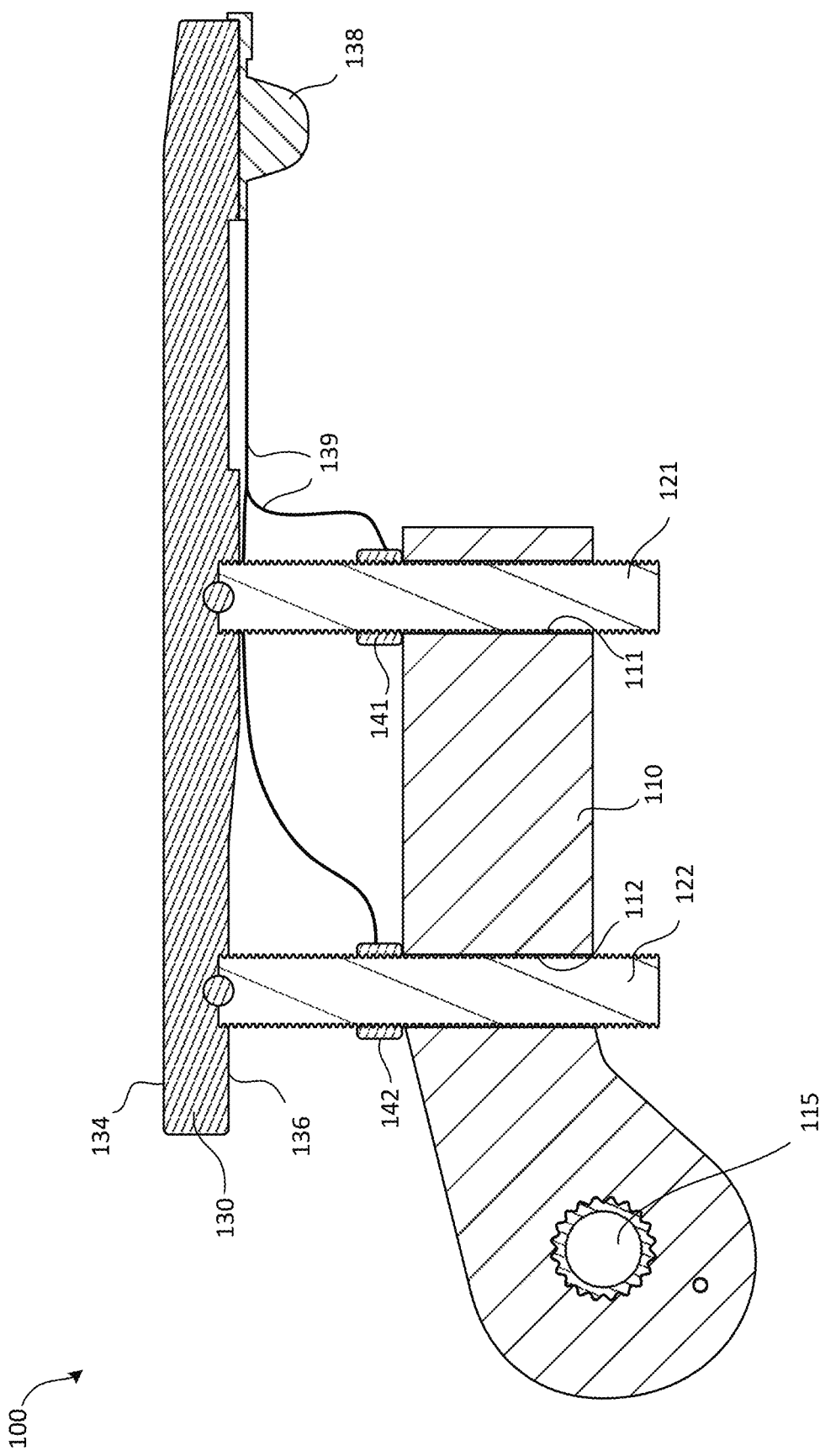
FIG. 1 is a cross-sectional view of an armrest assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is an armrest assembly that is adjustable. Generally, the armrest assembly disclosed herein includes a base, an armrest, and one or more shafts extending from the base and being pivotably coupled to the armrest to facilitate quick and easy height and tilt adjustments to the armrest by a pilot or other occupant of the seat with which the armrest assembly is implemented. Although details and examples are included herein pertaining to implementing the armrest assembly for a seat of an aircraft, the present disclosure is not necessarily so limited, and thus aspects of the disclosed embodiments may be adapted for performance in a variety of other industries. As such, numerous applications of the present disclosure may be realized.

In various embodiments, and with reference to FIG. 1, the armrest assembly 100 includes a base 110, a shaft 121, and an armrest 130. The armrest 130 may include an underside 136 and an upper surface 134 configured to support a user's arm. The shaft 121 may be slidably coupled to the base 110 to allow for the height of the armrest 130 relative to the base 110 to be adjusted. Further, the shaft 121 may be pivotably coupled to the underside 136 of the armrest 130 to allow for the tilt/orientation of the armrest 130 to be adjusted relative to the base 110. Additional details pertaining to height and tilt adjustments are included below with reference to FIGS. 2A, 2B, 2C, 3A, 3B, and 3C.

In various embodiments, the shaft 121 is a first shaft 121, and the armrest assembly 100 includes a second shaft 122 pivotably coupled to the underside of the armrest 130. For example, the first shaft 121 may be coupled to a forward portion of the armrest 130 and the second shaft 122 may be coupled to a rear portion of the armrest 130. In various embodiments, the second shaft 122 is also slidably coupled to the base 110, thus allowing for both shafts 121, 122 to be independently adjusted to alter the height/tilt of the armrest 130. In various embodiments, and with reference to FIG. 5 and as described in greater detail below, the second shaft 522 is fixed relative to the base 510 such that only one of the two shafts (e.g., first shaft 521) is slidable relative to the base 510, thus providing tilt adjustability but not overall height adjustability.

In various embodiments, the pivoting connection between the one or more shafts and the armrest may allow for roll/tilt about a longitudinal axis of the armrest, thus allowing the armrest to not only be tilted in a forward and/or rear direction but also tilted laterally inward or laterally outward (relative to a user/occupant of the seat). In various embodiments, the base 110 is connected to seat support structure at a pivoting connection 115. Thus, the base 110 may pivot relative to the seat to provide a first extent/degree of incline for the armrest assembly, with the adjustability of the shafts providing further height/incline adjustability.

In various embodiments, the armrest assembly 100 further includes a locking mechanism configured to reversibly lock the first shaft 121 and the second shaft 122 relative to the base 110 to prevent sliding of the first shaft 121 and the second shaft 122 relative to the base 110 (a "locked configuration"). Correspondingly, the locking mechanism may also be configured to reversibly release the first shaft 121 and the second shaft 122 relative to the base 110 to allow sliding of the first shaft 121 and the second shaft 122 relative to the base 110 (a "released configuration"). In various embodiments, and as described in greater detail below with reference to FIGS. 4A and 4B, the locking mechanism may include respective clamp rings 141, 142 for the shafts 121, 122. That is, a first clamp ring 141 may be disposed around the first shaft 121 and a second clamp ring 142 may be disposed around the second shaft 122.

In various embodiments, and with continued reference to FIG. 1, the armrest 130 of the armrest assembly 100 includes a graspable handle 138. The graspable handle 138 may be configured to actuate the locking mechanism, thereby allowing a user/occupant to easily and quickly switch between the locked configuration and the released configuration. In various embodiments, the graspable handle 138 may be disposed on the underside 136 of the armrest 130, and may be configured to translate back and forth along a section of the armrest 130. In response to the translating motion of the graspable handle 138, a control cable 139 may transmit said movement to the locking mechanism (e.g., the clamp rings 141, 142) to toggle the locking mechanism between the locked and released configuration. In various embodiments, actuation of the graspable handle 138 controls the locking and release of both shafts 121, 122, thus allowing the height and the tilt of the armrest 130 to be fully customized (e.g., as shown in FIGS. 2A-3C).

In various embodiments, the first and second shafts 121, 122 are threaded, or have some other outward surface features that allow for secure engagement with the corresponding clamp rings 141, 142. In various embodiments, the first and second clamp rings 141, 142 have complementary threads or other inward surface features. In various embodiments, the base 110 defines a first slot 111 for slidably receiving the first shaft 121 and a second slot 112 for slidably receiving the second shaft 122. In various embodiments, the first and second slots 111, 112 are non-threaded. For example, the shafts 121, 122 may not directly and positively engage with the inward surfaces of the slots 111, 112, but instead the slots 111, 112 are mere guide channels for ensuring the shafts 121, 122 that facilitate sliding of the shafts 121, 122 therein. In various embodiments, the respective sliding/engagement surface(s) of the slots 111, 112 and the shafts 121, 122 may include a self-lubricating material, or may otherwise be configured to enable motion relative to each other. In various embodiments, the clamp rings 141, 142 are affixed/mounted to the base 110.

In various embodiments, and with reference to FIGS. 2A, 2B, 2C, 3A, 3B, and 3C, examples of the height and tilt adjustability of the armrest assembly 100 are provided. To avoid obscuring the clarity of these depictions, the locking mechanism is not shown in these views. In various embodiments, and with reference to FIGS. 2A, 2B, and 2C, both shafts 121, 122 may be translated relative to the base 110 to the same extent, thus maintaining a constant tilt/orientation of the armrest 130 but adjusting the overall height of the armrest 130. In various embodiments, and with reference to FIGS. 3A, 3B, and 3C, one of the shafts may be translated while the other shaft is not translated (or is at least translated to a lesser extend), thus allowing for the forward/rearward tilt of the armrest 130 to be adjusted.

Figure 4A:
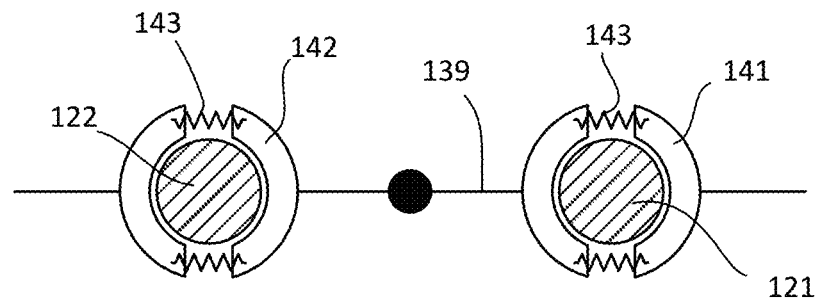
FIG. 4A is a cross-sectional view of a locking mechanism in a locked configuration, in accordance with various embodiments.
Figure 4B:
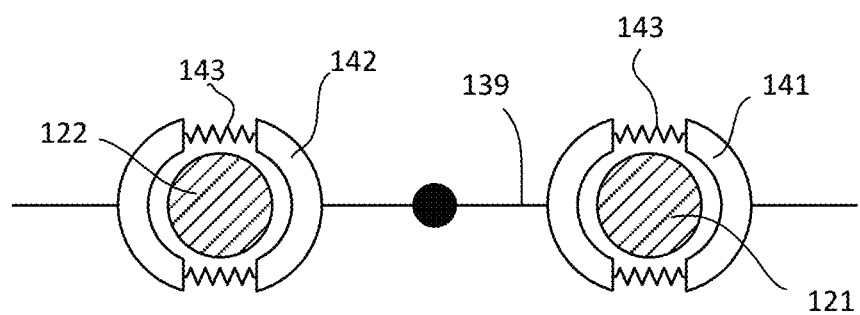
FIG. 4B is a cross-sectional view of a locking mechanism in a released configuration, in accordance with various embodiments.

In various embodiments, and with reference to FIGS. 4A and 4B, an example of the locking mechanism is provided in the locked configuration (FIG. 4A) and the released configuration (FIG. 4B). In various embodiments, each of the clamp rings 141, 142 includes two portions (e.g., two halves) coupled together via a spring element 143. The spring element 143 may bias the two portions together, thus causing the clamp rings 141, 142 to securely engage the retained shafts 121, 122 in the locked configuration. In response to actuation of the graspable handle 138, the control cable 139 transmits a pulling force to the clamp rings 141, 142 to overcome the bias of the spring element 143, thus causing the portions of each clamp ring 141, 142 to separate from each other and thus sufficiently disengage from the shafts 121, 122 to allow movement of the shafts 121, 122.

Figure 5:
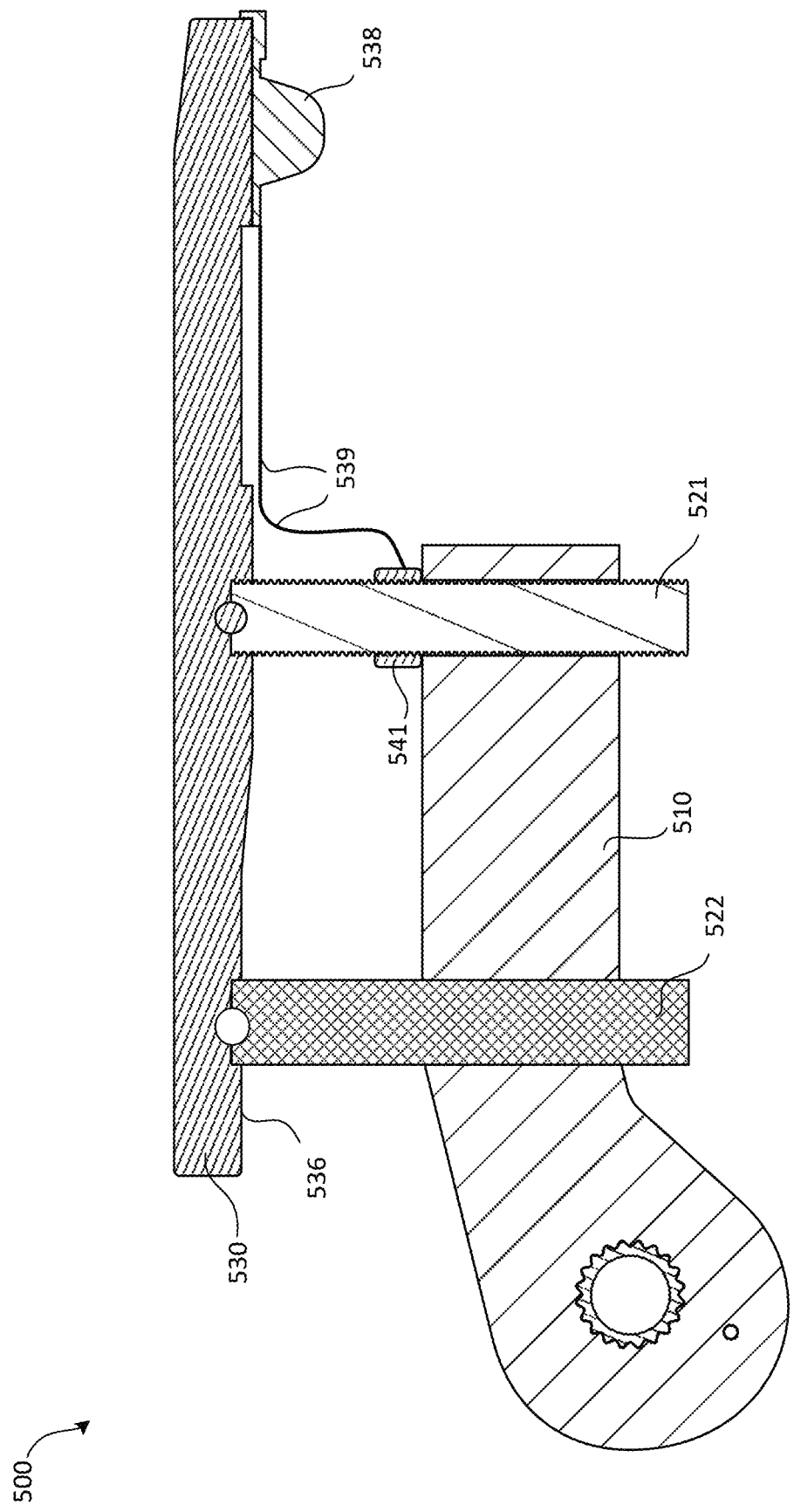
FIG. 5 is a cross-sectional view of an armrest assembly having one fixed shaft, in accordance with various embodiments.

In various embodiments, and with reference to FIG. 5, the armrest assembly 500 includes a first shaft 521 that is slidably retained within a slot of the base 510 and a second shaft 522 that is fixed relative to the base 510 (e.g., that is non-movable relative to the base 510). The second shaft 522 is still pivotably coupled to the underside 536 of the armrest 530, thus allowing the armrest 530 to tilt in response to sliding movement of the first shaft 521 relative to the base 510. In various embodiments, the locking mechanism includes a single clamp ring 541 that is actuated via a control cable 539 extending from the graspable handle 538.

Figure 6:
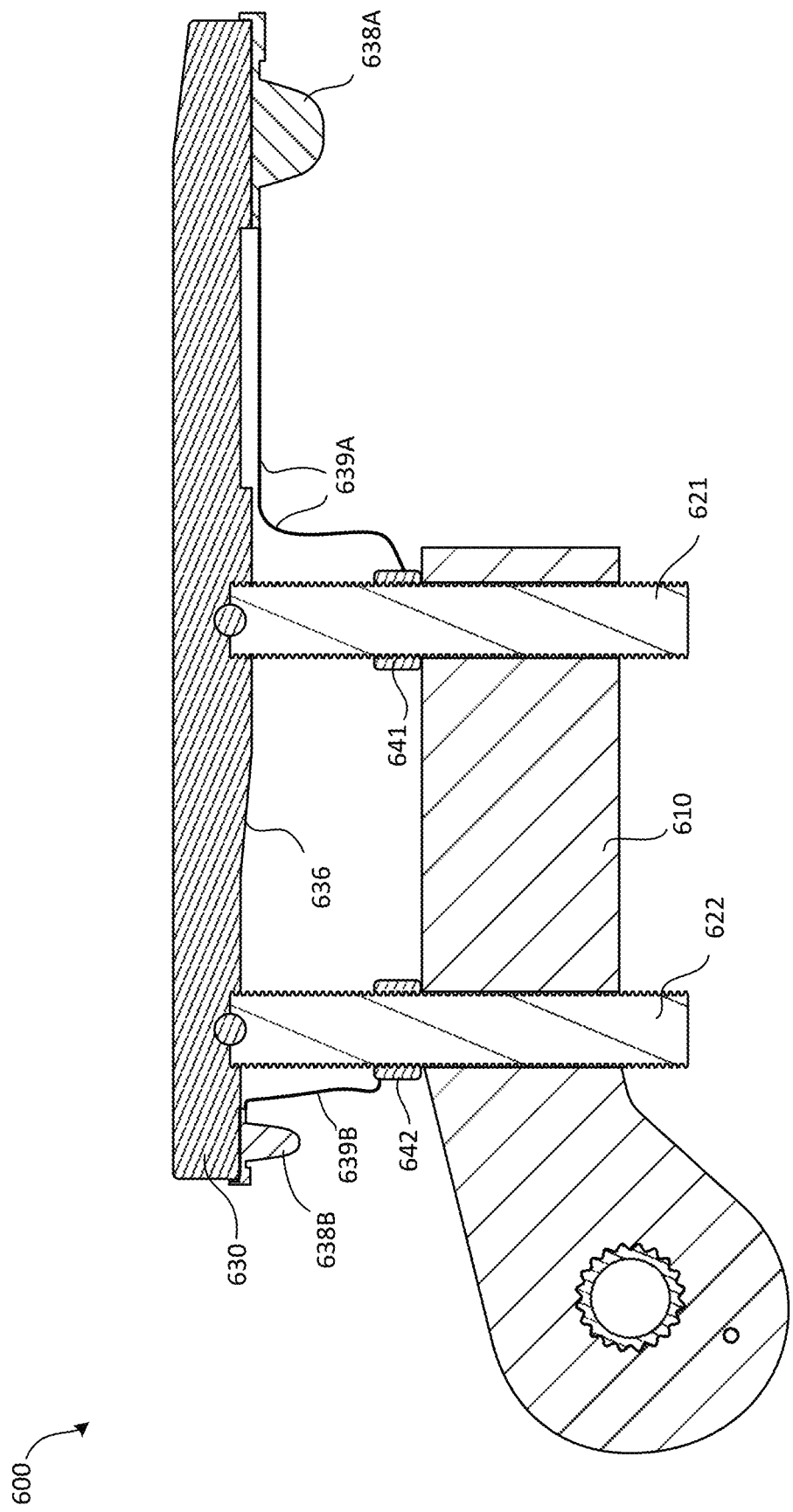
FIG. 6 is a cross-sectional view of an armrest assembly having two shafts with independent and separate locking mechanisms, in accordance with various embodiments.

In various embodiments, and with reference to FIG. 6, the armrest assembly 600 includes a first shaft 621 that is slidably retained within a slot of the base 610 and a second shaft 622 that is also slidably retained within another slot of the base 610. The armrest assembly 600 may include two separate locking mechanism, one for each of the shafts 621, 622. In various embodiments, a first locking mechanism, which may include a first clamp ring 641 actuatable by a first graspable handle 638A and a first control cable 639A, may be configured to reversibly lock/release the first shaft 621 relative to the base 610. In various embodiments, a second locking mechanism separate and independent from the first locking mechanism, which may include a second clamp ring 642 actuatable by a second graspable handle 638B and a second control cable 639B, may be configured to reversibly lock/release the second shaft 622 relative to the base 610. Said differently, the two shafts 621, 622 of the armrest assembly 600 may be configured to be independently and separately actuatable. In various embodiments, electric actuators may be utilized to electrically actuate adjustment of the armrest assembly. That is, the system may include a controller and one or more electric actuators electrically coupled to the controller. The controller may be configured to send control signals to the electric actuators for powered control of the armrest.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An armrest assembly for a seat, the armrest assembly comprising:
    a base;
    an armrest comprising an underside and an upper surface configured to support a user's arm;
    a first shaft slidably coupled to the base and pivotably coupled to the underside of the armrest;
    a second shaft slidably coupled to the base and pivotably coupled to the underside of the armrest;
    a locking mechanism comprising a first clamp ring disposed around the first shaft and a second clamp ring disposed around the second shaft, wherein each of the first clamp ring and the second clamp ring comprises two portions coupled together via a spring element, the locking mechanism being configured to reversibly lock the first shaft and the second shaft in a locked configuration and reversibly release the first shaft and the second shaft in a released configuration, wherein in the locked configuration the first shaft and the second shaft are prevented from sliding of relative to the base, and wherein in the released configuration the first shaft and the second shaft are allowed to slide relative to the base; and
    a graspable handle configured to actuate the locking mechanism between the locked configuration and the released configuration, wherein the graspable handle is configured to actuate both the first clamp ring and the second clamp ring.

2. The armrest assembly of claim 1, wherein the first shaft is pivotably coupled to a forward portion of the armrest and the second shaft is pivotably coupled to a rear portion of the armrest.

3. The armrest assembly of claim 1, further comprising a control cable extending from the graspable handle to the first clamp ring and the second clamp ring.

4. The armrest assembly of claim 1, wherein the first shaft and the second shaft are threaded.

5. The armrest assembly of claim 4, wherein the first clamp ring and the second clamp ring are threaded.

6. The armrest assembly of claim 4, wherein the base defines a first slot and a second slot, wherein the first shaft is configured to slide longitudinally within the first slot and the second shaft is configured to slide longitudinally within the second slot.

7. The armrest assembly of claim 6, wherein the first slot and the second slot are non-threaded.

8. An armrest assembly for a seat, the armrest assembly comprising:
    a base defining a first slot and a second slot;
    an armrest comprising an underside and an upper surface configured to support a user's arm;
    a first shaft slidably received within the first slot and pivotably coupled to the underside of the armrest;
    a second shaft slidably received within the second slot and pivotably coupled to the underside of the armrest;
    a locking mechanism comprising a first clamp ring disposed around the first shaft and a second clamp ring disposed around the second shaft, wherein each of the first clamp ring and the second clamp ring comprises two portions coupled together via a spring element; and
    a graspable handle configured to actuate the locking mechanism between a locked configuration and a released configuration, wherein in the locked configuration the first shaft and the second shaft are prevented from sliding of relative to the base, and wherein in the released configuration the first shaft and the second shaft are allowed to slide relative to the base, wherein the graspable handle is configured to actuate both the first clamp ring and the second clamp ring.

* * * * *

UNITED STATES PATENT AND TRADEMARK OFFICE
CERTIFICATE OF CORRECTION

PATENT NO. : 11,618,572 B2  
APPLICATION NO. : 16/985639  
DATED : April 4, 2023  
INVENTOR(S) : Sreekanth Koti Ananda Rao Page 1 of 1

It is certified that error appears in the above-identified patent and that said Letters Patent is hereby corrected as shown below:

In the Claims

Claim 8, Column 8, Line 42: after the phrase "realtive to the base," please delete the word "and"

Signed and Sealed this  
Twenty-ninth Day of August, 2023

Katherine Kelly Vidal  
*Director of the United States Patent and Trademark Office*